Feb. 11, 1969 W. V. PARSHALL 3,426,921
METHODS OF AND APPARATUS FOR SEPARATING COILS
DISPOSED IN CLOSE FACE-TO-FACE RELATION
Filed May 1, 1967 Sheet 1 of 4
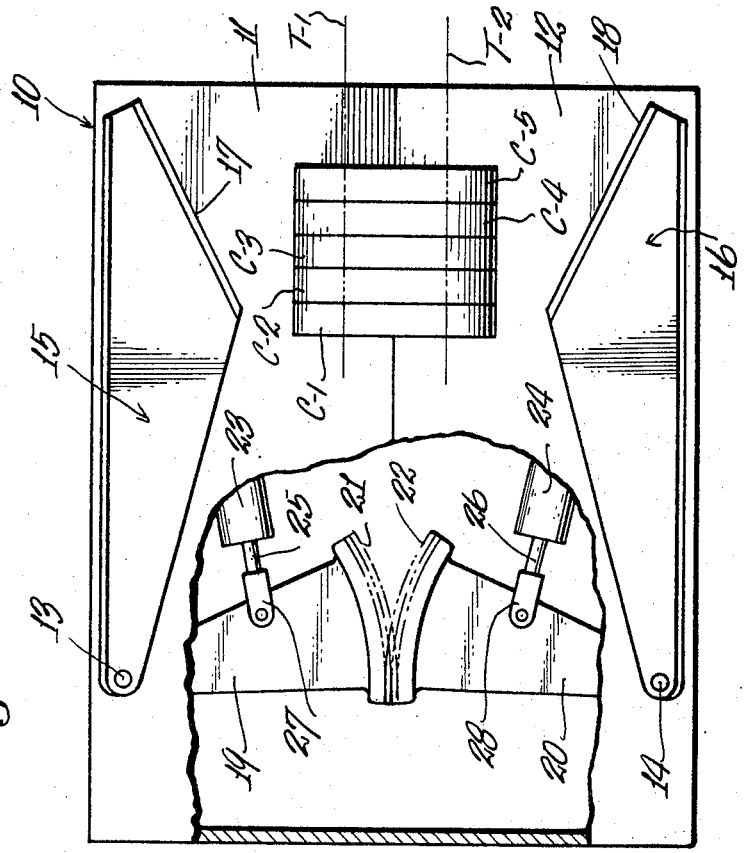
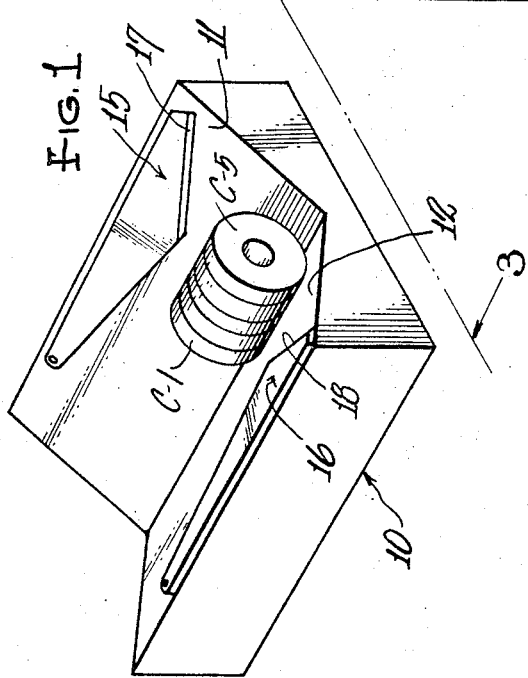
INVENTOR.
WILLIAM V. PARSHALL
BY
Williams and Kreake
ATTORNEYS.

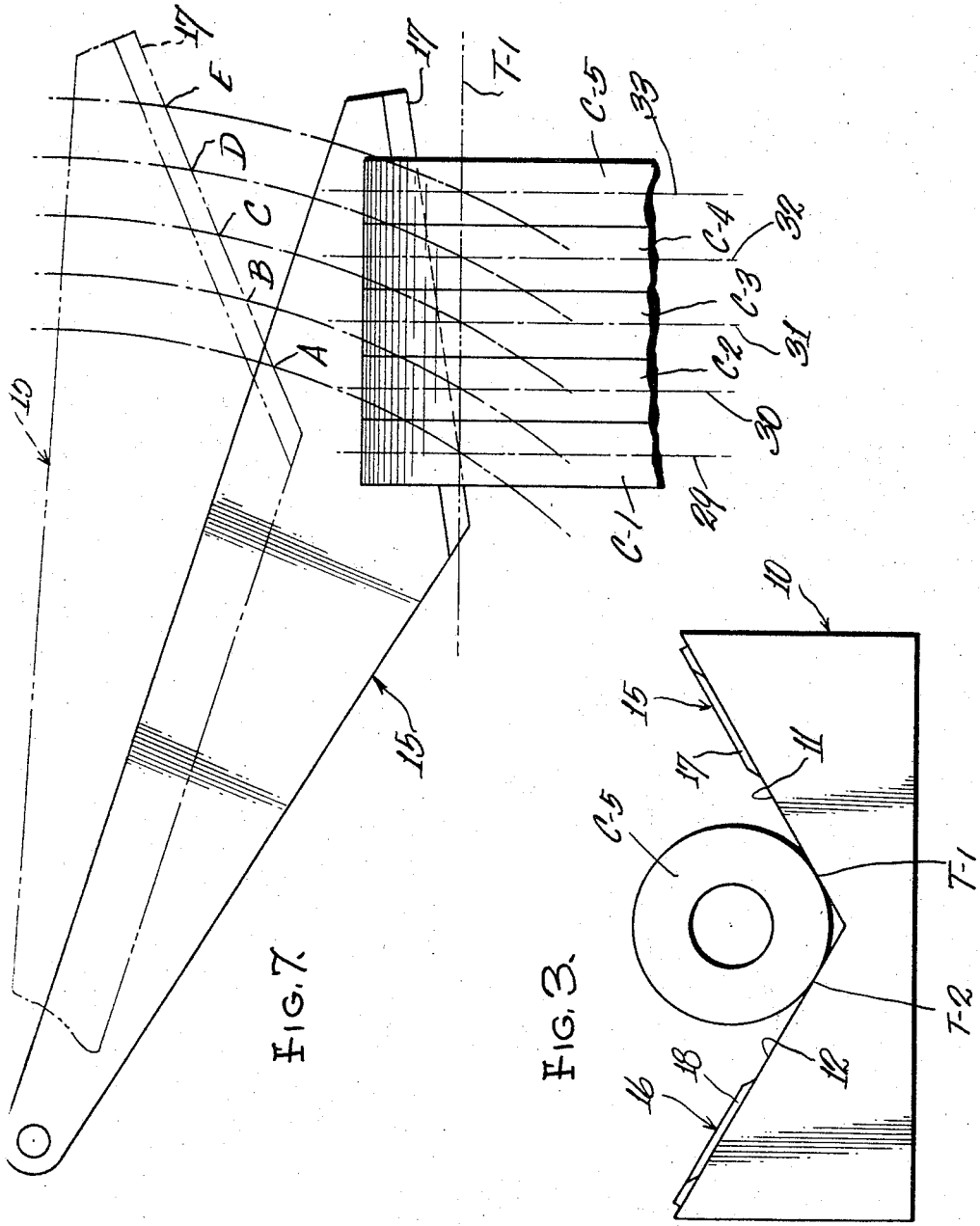

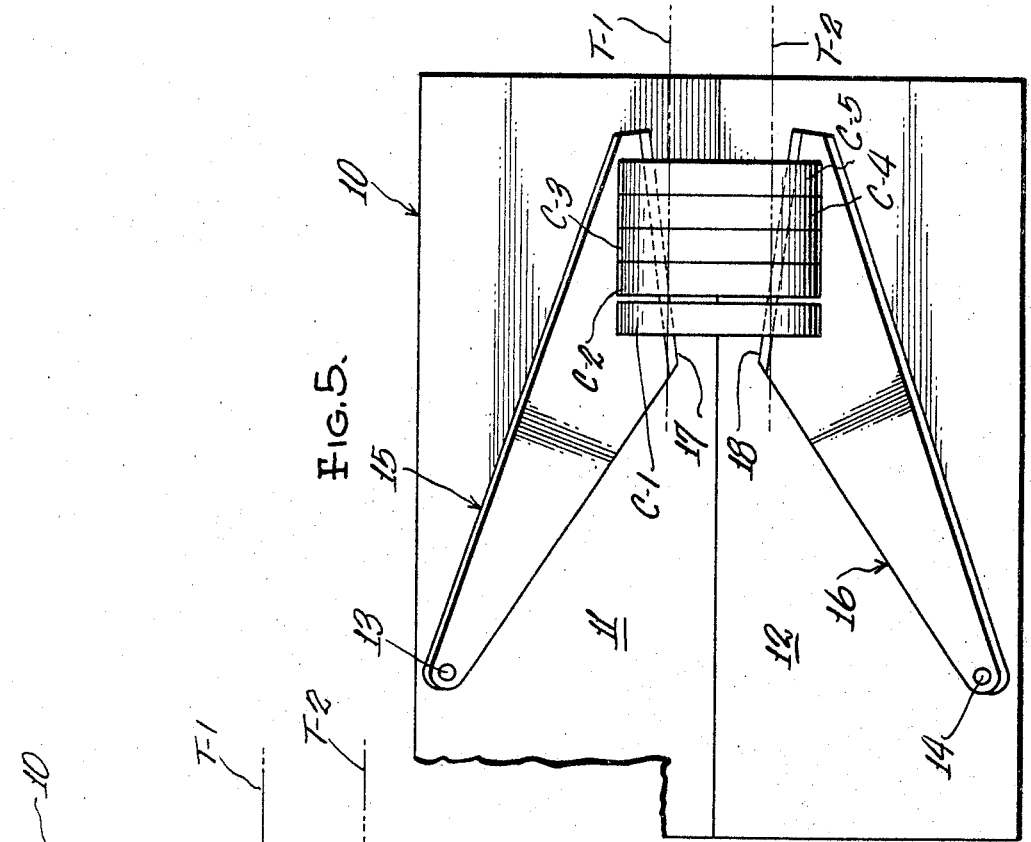
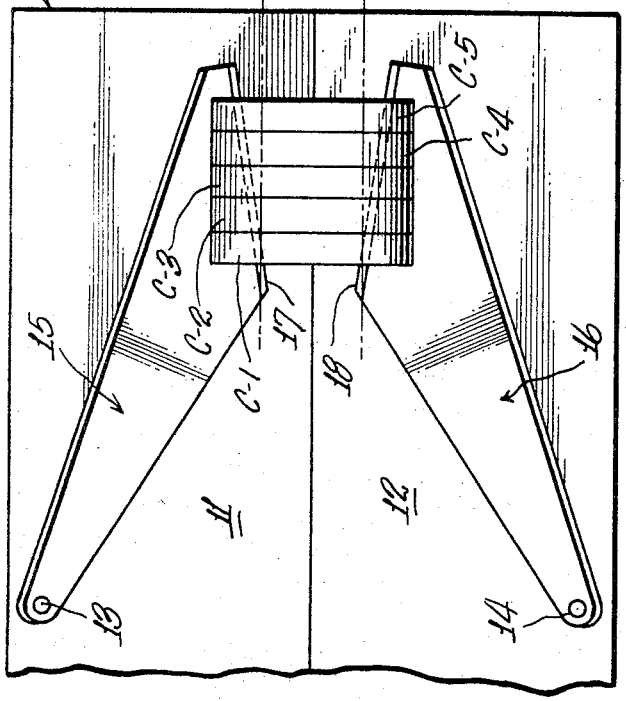

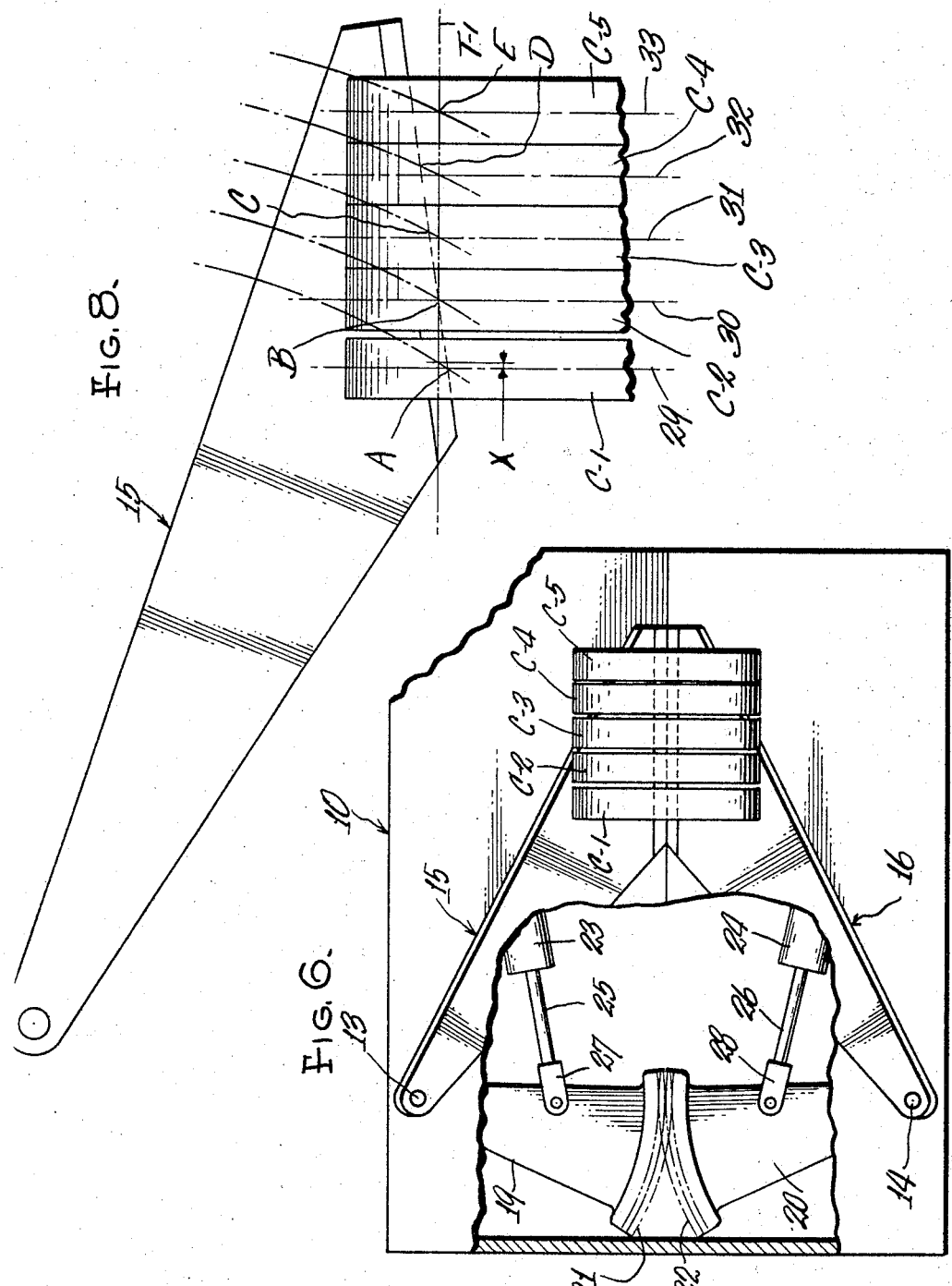

United States Patent Office 3,426,921
Patented Feb. 11, 1969

3,426,921
METHODS OF AND APPARATUS FOR SEPARATING COILS DISPOSED IN CLOSE FACE-TO-FACE RELATION
William V. Parshall, 3527 Atlantic St. NE.,
Warren, Ohio 44483
Filed May 1, 1967, Ser. No. 635,196
U.S. Cl. 214—1   12 Claims
Int. Cl. B25j 3/00; B23p 19/04; B65g 69/00

ABSTRACT OF THE DISCLOSURE

This invention relates to the separation of a plurality of coils disposed in close, face-to-face relation when such coils are supported at outer peripheral portions by the progressive elevation of successive coils beginning with an end-most coil and the substantially simultaneous axial movement of successive coils in their order of elevation. In apparatus for practicing the invention, a pair of members are simultaneously moved in arcuate paths to successive engagement beneath the coils for elevating and axially moving the same.

Preamble

In the the handling of coiled strip material, a plurality of coils are frequently disposed in close, face-to-face relation and it is necessary to separate such coils to, for example, individually band the latter for shipment and/or to dispose separators of heavy paper or the like between the coils to insure against damage to the edges of the strip from which the coils are formed. Heretofore, axial separation of the coils disposed as above mentioned could be accomplished only by individual handling of the coils and this is a slow, expensive operation. Moreover, separation of coils in the past has at times been very difficult since it is not infrequent that adjoining coils telescope slightly into each other thus causing them to wedge together. Prior art attempts to separate such wedged-together coils have been makeshift and such attempts frequently result in considerable damage to the coils.

The present invention makes it possible to bodily dispose a plurality of coils in close, face-to-face relation in position on apparatus embodying the invention, to axially separate the coils in a single motion in but a few seconds time, and to as quickly return the coils to their previous close relationship after banding the latter or disposing the required separators therebetween. Since the instant invention separates the coils by relative axial movement, even the wedged-together coils previously mentioned are separated with no difficulty and without damage. Other advantages of the present invention will readily become apparent from a study of the following description and from the drawings appended hereto.

In the drawings accompanying this specification and forming a part of this application there is shown, for purpose of illustration, an embodiment which the invention may assume, and in these drawings:

FIGURE 1 is a perspective view of apparatus embodying the present invention,

FIGURE 2 is an enlarged top plan view of the apparatus seen in FIGURE 1, parts on the near side being broken away to show underlying structure, FIGURE 3 is an end elevational view of the apparatus generally corresponding to the line 3—3 of FIGURE 1, FIGURES 4, 5 and 6 are views similar to FIGURE 2 but showing certain parts in other positions, and FIGURES 7 and 8 are enlarged, fragmentary, generally diagrammatic views generally corresponding to FIGURES 4 and 5 respectively.

With reference to FIGURES 1, 2 and 3, apparatus of the present invention preferably comprises a base 10 providing an upwardly facing trough formed by angularly disposed, plane surfaces 11 and 12. In a manner later to be disclosed, a plurality of coils C–1, C–2, C–3, C–4 and C–5 are adapted to be disposed in close, face-to-face relation on the surfaces 11 and 12, as shown, for subsequent axial separation from each other.

Pivotally secured to the upper side of respective base surfaces 11, 12, as by means of respective pivot shafts 13, 14 are blade-like members 15, 16 having respective margins 17, 18 disposed at an angle to respective member pivots. Member margins 17, 18 are beveled to provide knife-like edges for a purpose to appear.

Means are provided for simultaneously shifting the members 15, 16 from the positions seen in FIGURE 2 to the positions seen in FIGURE 6 and as herein shown, arms 19, 20 are secured to respective member shafts 13, 14 beneath the base surfaces 11, 12. Arms 19, 20 extend toward each other and have intermeshed gear segments 21, 22 at their free ends. Fluid cylinders 23, 24 have their piston rods 25, 26 pivotally connected to respective arms as by clevises 27, 28. The arrangement is such that when the piston rods 25, 26 are extended, arms 19, 20 will be shifted from the position seen in FIGURE 2 to the positions seen in FIGURE 6 thus shifting the members 15, 16 therewith. Interengagement of the gear segments 21, 22 of course, insures simultaneous movement of the arms 19, 20 and of the members 15, 16.

With the coils C–1 through C–5 resting in the trough provided by the base surfaces 11, 12 and with reference to FIGURE 3, it will be noted that the coils are supported by the surfaces at peripheral, circumferentially spaced places where they are tangent to respective surfaces. Such supporting places of tangency are shown as points T–1 and T–2 respectively in FIGURE 3 and are represented by lines T–1 and T–2 in FIGURES 2, 4 and 5.

Assuming the members 15, 16 to be moved from the positions seen in FIGURE 2 to the positions seen in FIGURE 4, it will be noted that the member knife edges 17, 18 have just passed beyond the tangent lines T–1, T–2, of coil C–1 and thus the latter has been raised by wedging action of the members 15, 16 from the surfaces 11, 12 and is now supported by such members. Note also that the member edges 17, 18 have just reached the lines of tangency of the coil C–2 and thus the latter remains supported by the surfaces 11, 12 until further movement of the members 15, 16 toward each other. Coils C–3, 4 and 5, of course, also remain supported at this time by the surfaces 11, 12.

Continued movement of the members 15, 16 toward each other, as to the positions seen in FIGURE 5, will raise the coil C–2 from the surfaces 11, 12 so that it is supported by the members 15, 16. During such movement, however, the coil C–1, since it is supported by the members 15, 16, will move therewith in an axial direction away from the coil C–2 to provide a gap therebetween as shown in FIGURE 5. Continued movement of the members 15, 16 toward each other, following support of coil C–2 thereon, will cause axial movement of the latter away from coil C–3; however, the gap between coils C–1 and C–2 will remain unchanged since both will move together in the same direction and at the same rate.

The foregoing steps will be repeated with coils C–3, 4 and 5, until with the members 15, 16 disposed as seen in FIGURE 6, all coils will be supported by the members and each will be axially separated from its neighbor an amount sufficient to permit separators to be placed between the coils and/or to allow the coils to be individually banded transversely of their axes. Following disposition of separators between the coils and/or banding thereof, the members 15, 16 will be returned to their positions seen in FIGURE 2. During return of the members 15, 16, the previously described axial separation of the coils C-1 through C-5 will be reversed thus once again disposing the coils as close together as permitted by the previously installed separators or bands. The coils may now be removed from the base 10 by any suitable means not forming a part of this invention and another group of coils disposed in position on the apparatus for axial separation as previously described.

Enlarged, fragmentary views FIGURES 7 and 8 show with greater particularity the manner in which the present invention functions. In these views, lines 29, 30, 31, 32 and 33 represent generally central, transverse planes of respective coils C-1 through C-5 while A, B, C, D and E represent points on the member knife edge 17 which move in the arcuate paths shown through respective points of intersection of the coil planes aforesaid with the previously mentioned tangent line T-1.

With the member 15 in the full-line position seen in FIGURE 7, it will be noted that the point A of member 15 has reached line T-1 while member points B through E are still spaced from such line. Coil C-1, at this time, has just become supported by the member 15, and, of course, its companion member 16 which has been omitted from this view. Accordingly, any further movement of member 15 in a clockwise direction will cause axial movement of the coil C-1.

FIGURE 8 illustrates the position of member 15 following sufficient clockwise movement thereof to intersect member point B with the tangent line T-1. Member point A, in moving along its arcuate path from the full line position seen in FIGURE 7 to the position seen in FIGURE 8, will traverse the resultant horizontal distance X (in the position of parts shown) carrying the coil C-1 therewith and away from coil C-2 to thus establish the illustrated axial spacing therebetween. Further clockwise movement of the member 15 will cause the coil C-2 to move axially along with the coil C-1 without affecting the axial spacing therebetween. Such continued clockwise movement of the member 15 will successively shift coils C-3, C-4 and C-5 in the manner hereinabove described to establish and maintain axial spacing therebetween.

It is to be understood that the member 16, in moving in synchronized relation with the member 15, functions in the same manner as the latter and, because such members are in opposed relation, the coils move not in an arcuate path with the members but in the resultant, axial path hereinabove described.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. Apparatus for axially separating coils disposed in close, face-to-face relation, comprising
   a V-shaped support providing inclined surfaces underlying and peripherally supporting said coils,
   and a pair of members having coil-engaging portions projecting above respective surfaces aforesaid on opposite sides of said coils and movable in respective paths toward each other and axially of said coils to engagement beneath the latter for elevating and axially shifting the same, each of said coil-engaging member portions being so disposed relative to the path of movement of its respective member that such portions successively engage said coils commencing with an endmost coil.

2. The construction of claim 1 and further comprising means for effecting unitary movement of said members.

3. The construction of claim 2 wherein said means interconnects said members for unitary movement.

4. The construction of claim 1 wherein said coils are moved axially by said members in the same direction and wherein the coil first engaged by said members is axially moved thereby the greatest distance while successively engaged coils are axially moved by said members progressively smaller distances.

5. The construction of claim 4 wherein each member is swingable about a pivot,
   and wherein said member pivots are disposed closest said end-most coil to cause those member portions which engage successive coils to traverse respective arcuate paths of progressively greater radii.

6. The construction of claim 5 wherein said members are moved toward each other to effect axial movement of said coils.

7. The construction of claim 5 werein each member has a rectilinear edge for engagement with said coils and wherein respective member edges are inclined relative to respective member pivots to provide for successive coil engagement or aforesaid.

8. The construction of claim 7 wherein respective member edges are beveled to provide wedge-like portions which can be forced beneath said coils without damage thereto.

9. The method of axially separating coils disposed in close, face-to-face relation, which method comprises
   supporting said coils on a substantially identical level at their outer peripheries,
   progressively elevating successive coils to another substantially identical but higher level commencing with an end-most coil,
   and successively effecting axial movement and separation of said coils substantially simultaneously with coil elevation in the order aforesaid.

10. The method of claim 9 wherein said coils are initially supported at circumferentially spaced places,
    and wherein said coils are elevated by successively engaging the latter at circumferentially spaced places adjacent said first-mentioned places.

11. The method of placing protective material between coils disposed in close, face-to-face relation, which comprises
    supporting said coils at their outer peripheries,
    progressively elevating and supporting successive coils commencing with an end-most coil,
    successively effecting axial movement of said coils substantially simultaneously with coil elevation in the order aforesaid,
    disposing protective material between the separated coils,
    and axially shifting said coils to close, face-to-face relation once again with said protective material positioned therebetween.

12. The method of separating and re-positioning coils disposed in close, face-to-face relation, which comprises
    supporting said coils on a substantially identical level at their outer peripheries,
    progressively elevating successive coils to another substantially identical but higher level commencing with an end-most coil,
    successively effecting axial movement and separation of said coils substantially simultaneously with coil elevation in the order aforesaid,
    and axially shifting said coils to close, face-to-face relation once again.

(References on following page)

References Cited

UNITED STATES PATENTS

| | | | |
|---|---|---|---|
| 1,791,793 | 2/1931 | Chambers | 29—239 |
| 2,801,011 | 7/1957 | Overlach et al. | 214—16.1 |
| 1,108,876 | 9/1914 | Alemany. | |

GERALD M. FORLENZA, *Primary Examiner.*

F. E. WERNER, *Assistant Examiner.*

U.S. Cl. X.R.

29—239; 214—152